(No Model.) 2 Sheets—Sheet 1.

J. W. HYATT.
PUMP.

No. 369,289. Patented Aug. 30, 1887.

Attest:
Frank L. Morton
Thos. S. Crane

Inventor
John W. Hyatt

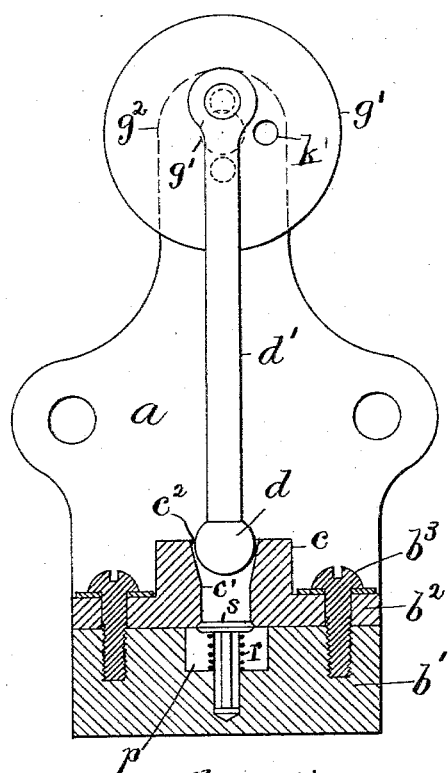

UNITED STATES PATENT OFFICE.

JOHN W. HYATT, OF NEWARK, NEW JERSEY, ASSIGNOR TO THE HYATT PURE WATER COMPANY, OF SAME PLACE.

PUMP.

SPECIFICATION forming part of Letters Patent No. 369,289, dated August 30, 1887.

Application filed August 17, 1886. Serial No. 211,093. (No model.)

*To all whom it may concern:*

Be it known that I, JOHN W. HYATT, a citizen of the United States, residing at Newark, Essex county, New Jersey, have invented certain new and useful Improvements in Pumps, which are fully described and represented in the following specification and the accompanying drawings, forming a part of the same.

This invention relates to a means for supplying a definite charge of a coagulating or precipitating agent to impure water to prepare the same for purification by a filtering or settling process; and it consists in the particular construction for a pump, as hereinafter fully set forth. Such chemical agents are liable to corrode and derange the parts of an ordinary pump; and the object of my invention is to furnish a construction which is cheap, simple, durable, and composed of such few parts as to maintain its efficiency for a long time.

The pump is represented herein as actuated by a motor, and the latter may, when the purification is effected by a filtering process, be actuated by the current in the filter-conduit, as claimed by me in a copending application, and the movements of the pump may be thus automatically regulated to the volume purified.

Figure 2:
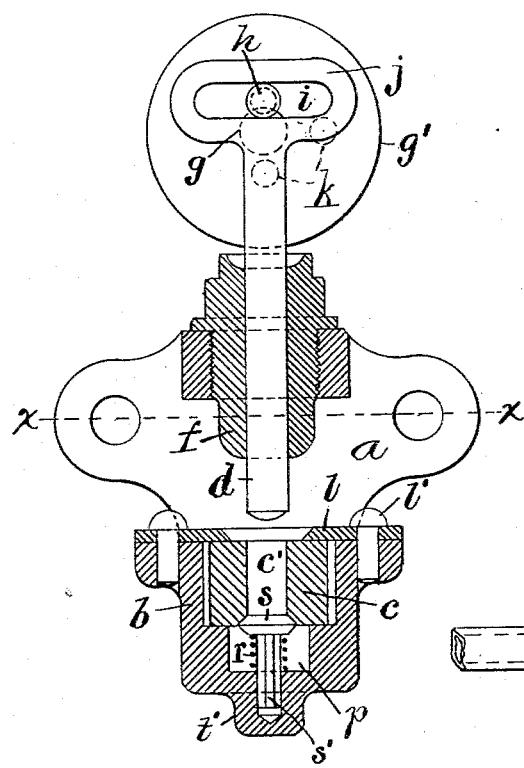
Figure 1:
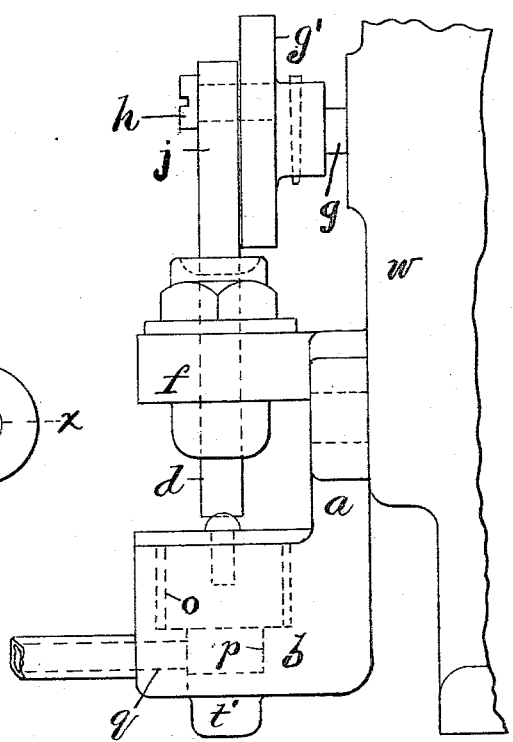
Figure 3:
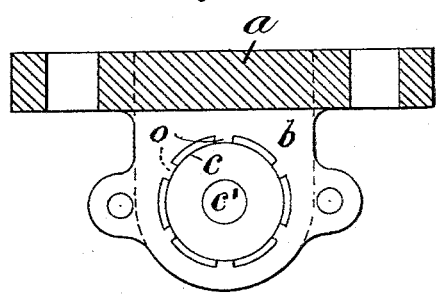
Figure 4:
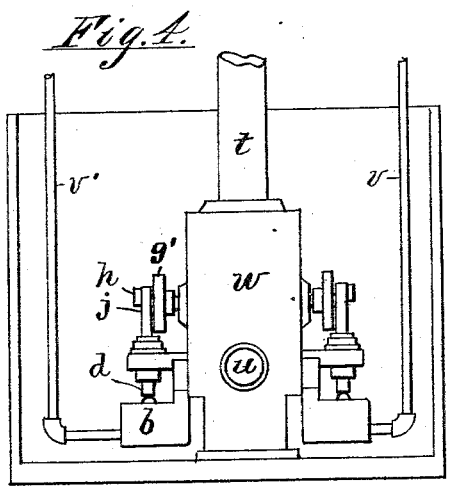

In the drawings, Figure 1 is an edge view of the pump with a portion of a motor, to the side of which it is shown as attached. Fig. 2 is a front view of the motor, the plunger-guide and the cylinder and its casing being shown in vertical section. Fig. 3 is a plan of the pump-cylinder and its casing, with a section of the bed-plate on line $x$ $x$ in Fig. 2. Fig. 4 is a section of a tank containing a motor with a pump attached at each side thereof. Fig. 5 is a view similar to Fig. 2 of an alternative construction.

Fig. 4 illustrates a convenient means for arranging my device for use, the plunger of the pump being constructed to withdraw from the bore of the cylinder at each stroke, and the open end of the bore requiring to be supplied with the fluid when the plunger is thus withdrawn. The pump is therefore most conveniently operated by immersing it in a tank of the liquid chemical agent, as in Fig. 4. The bore of the cylinder is formed of elastic india-rubber and the plunger fitted to it tightly, the rubber thus expanding when the plunger enters the open end of the cylinder, but making a tight joint around the plunger, so that the liquid can only escape at the bottom of the cylinder, where a check-valve and outlet are provided for the purpose.

The simplest construction is shown in Fig. 5, in which $a$ is a bed-plate, provided with a valve-casing, $b'$, over which a pure-rubber cylinder, $c$, is secured by an integral rubber flange, $b^2$, and screws $b^3$. The mouth of the cylinder is open at the upper end, and the plunger $d$, attached to the lower end of a rod, $d'$, is actuated by a crank-pin, $h$, and rotary disk $g'$. The bed-plate is in this figure shown provided with a bearing, $g^2$, to sustain the shaft $h$; but this is not essential. The plunger is shown withdrawn from the bore of the cylinder; but the latter is provided with a flaring mouth to guide the plunger when again advanced, while admitting the fluid freely when retracted.

In Figs. 1 to 4 the plunger works through a guide, $f$, upon the bed, and the cylinder is formed as a rubber bushing, $c$, fitted to a cylinder-casing, $b$.

$g$ is a rotary shaft, provided with a crank-disk, $g'$, adjacent to the head $j$ of the plunger, and $h$ is a crank-pin fitted in the disk and inserted in a transverse slot, $i$, formed in the head $j$. The disk is shown provided with several crank-pin holes, $k$, formed at different distances from the center of the shaft $g$, and the stroke of the plunger may thus be varied at pleasure by shifting the pin $h$ to any of such holes.

The rubber bushing $c$ is inserted in a cavity provided with ribs $o$, which hold it concentric with the plunger, but permit its ready expansion when the plunger enters the bore $c'$.

The casing is formed below the bushing with a recess, $p$, having an outlet, $q$, to serve as a discharge from the pump, and a valve, $s$, is fitted within such recess and pressed normally against the lower side of the bushing $c$ by a spring, $r$. The valve is guided in its movements by a stem, $s'$, fitted to a socket, $t'$, below the casing.

In Fig. 4 the motor is shown as an edge view of a rotary cylinder, $w$, of which $g$ is the driving-shaft, *t* the inlet-pipe, and *u* the outlet-pipe, which may serve, if desired, as the filter-conduit.

The operation of the pump is as follows: Assuming it to be immersed in a tank or bath of the chemical agent, or the upper side of the bushing *c* to be otherwise supplied continuously with a current of such agent, the plunger is reciprocated in and out of the bore *c'*. As the plunger enters the bore the rubber yields sufficiently to permit its free entrance, while the elastic character of the rubber secures a water-tight joint around the plunger and prevents the escape of the contained liquid, except from the bottom of the bore. Such liquid therefore depresses the valve *s* and escapes by the outlet *q*, and the retraction of the plunger then serves to close the valve and induces a vacuum within the bore. Such vacuum induces an immediate flow of the superincumbent liquid when the plunger is withdrawn from the bore, as shown in Fig. 2, and the renewed descent of the plunger upon the liquid contained upon the bore then serves to expel it through the valve and outlet *q*, as before. The holding of the bushing at isolated points about its periphery, as by the ribs *o*, affords it an opportunity to expand laterally when the plunger is forced into the bore, and the wear of the india-rubber under the repeated movements of the plunger is thereby reduced to the greatest extent.

The material of the plunger and valve may be brass or any other substance not affected by the corrosive properties of the chemical agent, whether lime, iron sulphate, or whatever may be employed; and as both the valve and the plunger operate solely upon a yielding surface of rubber, it is obvious that leakage would be prevented in a very perfect manner and the efficiency and durability of the entire construction be maintained.

The rubber bushing is very inexpensive, and may be readily removed from the casing *b* by detaching a cap, *l*, attached by screws *l'*, and it may thus be readily replaced when worn out and a new one inserted, which would restore the efficiency of all the parts to their normal condition.

The delivery of the pump may be readily varied by alternating the stroke of the plunger with the use of the changeable crank-pin *h* and the holes *k*, and the volume of liquid delivered from the pump at each stroke may thus be varied from the smallest amount to the full capacity of the bore *c'*.

As the bore of the cylinder is supplied at the upper end, it is certain to fill when the plunger is withdrawn therefrom at each stroke, and a smaller volume of the fluid may be taken in and discharged from the pump at each stroke than would suffice with an ordinary suction-pump to produce the required vacuum to fill the cylinder.

A pump is shown attached to each side of the motor, and their discharge-pipes *v* and *v'* would be adapted to discharge, respectively, a coagulating and precipitating agent to the impure water, as claimed in my Patent No. 293,749, if the tank were divided by a suitable partition on the line of the motor, so that the pumps would be independently supplied with the separate agents.

Although I have shown the pump actuated by a motor herein, it is obviously immaterial how the movement of the pump is effected, and I do not therefore limit myself to any particular construction for the motor devices or their connection with the plunger to reciprocate the same.

The essential feature of my construction is the cylinder having its bore formed of soft india-rubber, with a valve seated against the soft rubber at one end of the bore, and the plunger retracted from the opposite end at each stroke to admit the liquid, and operating to expand the soft rubber when forced therein, so as to produce a tight joint and force the liquid past the valve.

It is obviously immaterial to my invention whether the bore of the pump be formed in a rubber bushing which is sustained by a casing around its periphery, as its functions depend solely upon its elasticity, and not upon the manner in which it is sustained upon the bed-plate of the pump or connected with the valve and its outlet.

By this construction the use of an inlet-valve is avoided, and the pump operates with only a single valve for discharging the contents of the cylinder.

I am aware that a casing provided with internal ribs has been filled with soft metal and bored out to form a cylinder, and I do not therefore claim the use of ribs in such manner, but only to sustain a soft-rubber cylinder in a yielding manner.

I am also aware that a rubber packing has been applied to the mouth of a pump-cylinder, and I do not therefore claim the use of india-rubber as a part of a pump-cylinder, but only when the entire bore is formed of soft india-rubber and the valve seated upon the lower end of the same and the bore expanded as far as the piston is inserted. By such construction I secure an elastic contact both of the piston and the valve and effect a tight joint for both in the presence of such substances as my pump is intended to deliver.

Having thus set forth my invention, what I claim, and desire to secure by Letters Patent, is—

1. In a pump, the combination, with a cylinder of soft india-rubber having its bore open at one end to admit a plunger and having a valve seated upon the opposite end of its bore, of a plunger moved alternately in and out of the bore at its open end and operating to expand the cylinder when forced therein, as and for the purpose set forth.

2. The combination, in a pump, of a metallic casing having a soft-rubber bushing or lining provided with a valve at one end of its bore seated directly upon the end of the soft-rubber bushing, and having a plunger moved alternately in and out of said bore at the opposite end and operating to expand the bore when forced therein, as and for the purpose set forth.

3. The combination, in a pump, of a metallic casing provided internally with longitudinal ribs, of a soft-rubber bushing fitted within such casing in contact with such ribs and adapted to expand between the same, the casing having a recess below the rubber bushing provided with an outlet, and a valve seated upon the end of the bushing within such recess, and a plunger moved alternately in and out of said bore at the opposite end from the valve and operating to expand the soft-rubber bushing between the ribs when forced therein, as and for the purpose set forth.

4. In a pump, the combination, with a metallic casing provided internally with longitudinal ribs, of a removable soft-rubber bushing fitted within such casing in contact with such ribs and adapted to expand between the same, the casing having a recess below the rubber bushing, and the recess being provided with an outlet, a valve seated upon the end of the bushing within such recess, a cap secured upon the casing to hold the bushing removably in place, and a vertical plunger actuated to move in and out of said bore and operating to expand the rubber when forced therein, as and for the purpose set forth.

In testimony whereof I have hereunto set my hand in the presence of two subscribing witnesses.

JOHN W. HYATT.

Witnesses:
THOS. S. CRANE,
FRANK L. MORTON.